Inventor
Clyde Chi Kai Kwok
By Stevens, Davis, Miller & Mosher
Attorneys

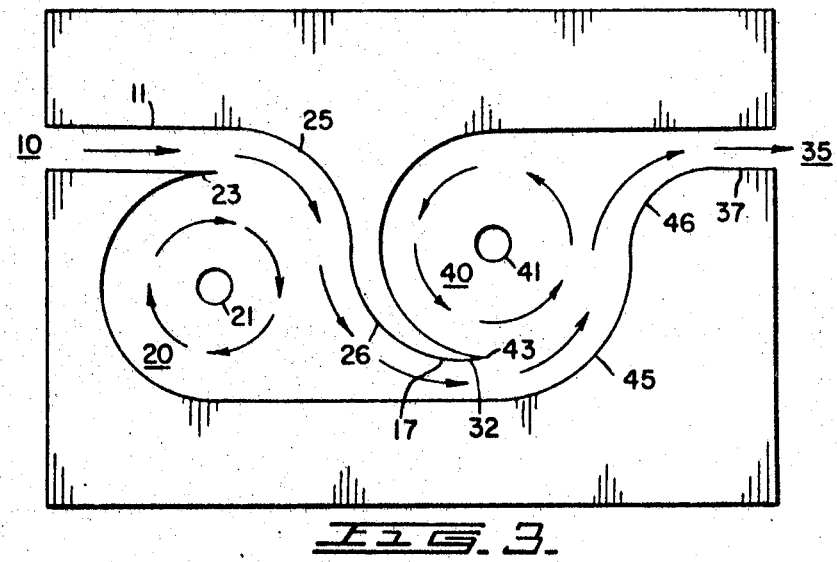
_FIG. 3._
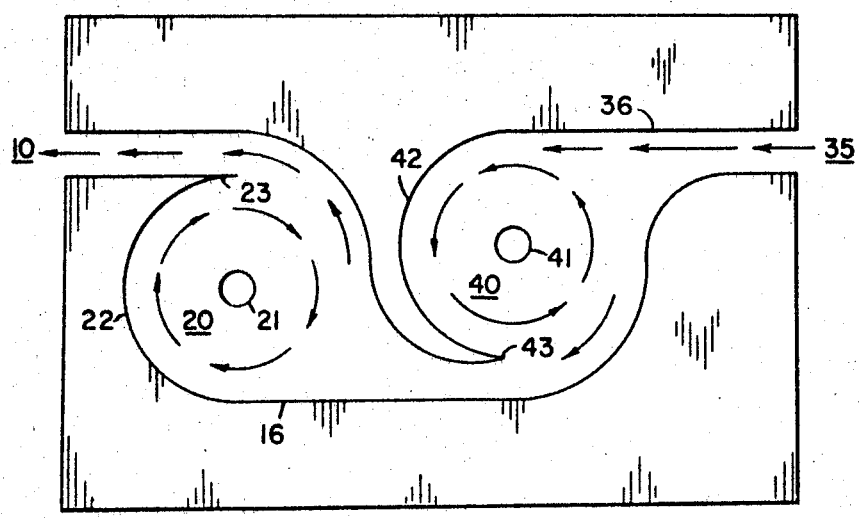
_FIG. 4._

United States Patent Office 3,461,897
Patented Aug. 19, 1969

3,461,897
VORTEX VENT FLUID DIODE
Clyde Chi Kai Kwok, Montreal, Quebec, Canada, assignor to Aviation Electric Limited, Montreal, Quebec, Canada
Filed Dec. 17, 1965, Ser. No. 514,543
Int. Cl. F15c 1/16
U.S. Cl. 137—81.5                2 Claims

ABSTRACT OF THE DISCLOSURE

A fluid diode device having a vortex chamber provided with central vent which in use discharges continuously, a first inlet conduit opening into the vortex chamber tangentially with respect to the outer wall of the chamber with its inner wall terminating at an acute angle to the outer wall of the chamber, and a second inlet/outlet conduit also opening into the vortex chamber tangentially with respect to the outer wall of the chamber but with its inner wall merging with the outer wall of the chamber in a smoothly rounded curve. When a fluid pressure is applied to the first conduit, fluid flows in vortex manner in the vortex chamber, some escaping through the central vent, but the fluid for the most part flowing with little hindrance round the smoothly rounded curve of the second conduit into the second conduit. Thus there is little attenuation of flow through the diode in this direction from the first conduit to the second conduit. On the other hand, when a fluid pressure is applied to the second conduit, fluid flows in vortex manner in the vortex chamber, some escaping through the central vent, but the fluid flow is in such a direction that substantially no flow into the first conduit can take place. Since there is a continuous discharge of fluid through the central vent, even with very large attenuation of the fluid flow from the second conduit to the first conduit, the vortex flow in the chamber is continued by the vortex flow of fluid from the second conduit to the central vent.

---

This invention relates to fluid operated systems which utilize the flow of a fluid so that the system performs functions which are analogous to those now being performed by electronic components and systems. More specifically, it is an object of this invention to provide a pure fluid diode without moving parts. Basically, a pure fluid diode having no moving parts, can be considered to be a device which allows fluid flow via a smooth path in one direction, but tends to prevent fluid flow in the opposite direction.

The present invention therefore provides a fluid control device comprising first and second fluid conduits and a fluid interaction region between the conduits, which region provides a fluid passage through the device. There is a centrally vented vortex chamber in the interaction region. The first conduit opens into the chamber tangentially thereof with respect to the outer wall of the chamber. The inner wall of the first conduit terminates at an acute angle to the outer wall of the chamber. The outer wall of the second conduit opens into the chamber tangentially with respect to the outer wall of the chamber, and the inner wall of the second conduit merges with the wall of the chamber in a smoothly rounded curve.

By means of the present invention there is provided a device whereby fluid entering the interaction zone by the first conduit meets very little resistance in passing around the outer wall of the chamber and leaving the chamber through the second conduit after flowing around the curved inner wall of the second conduit. On the other hand, fluid flowing into the interaction zone by the second conduit tends to flow in a circle around the outer wall of the chamber and is impeded in leaving the chamber by way of the first conduit by the acute angled projection forming the contact between the inner wall of the first conduit and the outer wall of the chamber. Thus the fluid flow in such reversed direction forms a vortex which tends to be vented through the vent in the chamber. Thus the device exhibits a back-to-front flow ratio which is considerably different from unity.

The present invention is related to the invention disclosed and claimed in copending application Ser. No. 412,478, filed Nov. 19, 1964.

In the drawings which form part of this specification, FIGURE 1 shows a schematic plan view of a single unit in accordance with this invention.

FIGURE 3 is a schematic diagram showing the series unit of FIGURE 2 under normal flow conditions.

FIGURE 4 is a schematic diagram showing the series unit of FIGURE 2 under reverse flow conditions.

Figure 1:
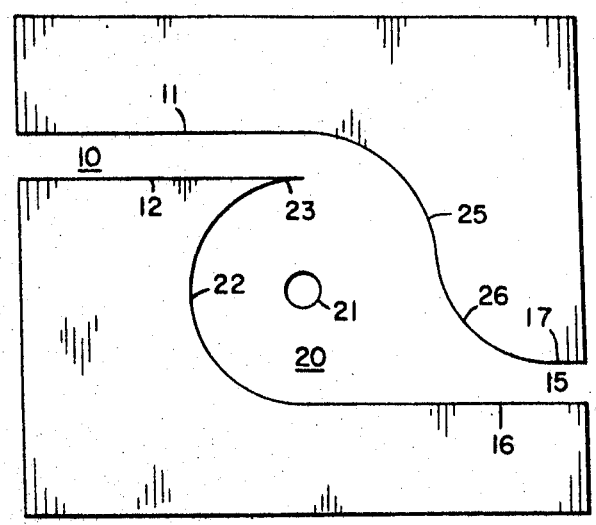

Referring to FIGURE 1, first conduit 10 has an outer wall 11 and an inner wall 12, second conduit 15 has an outer wall 16 and an inner wall 17, vortex chamber 20 has a vent 21 centrally located with respect to outer chamber wall portion 22. Wall 22 merges with outer conduit wall portion 16 at one extremity, and at the other extremity it meets inner conduit wall 12 at an acute angle to form a vortex guide portion 23. Chamber wall portion 25 merges with outer conduit wall 11 at one extremity, and at the other extremity it merges through a smoothly rounded curve portion 26 with inner conduit wall 17.

Figure 2:
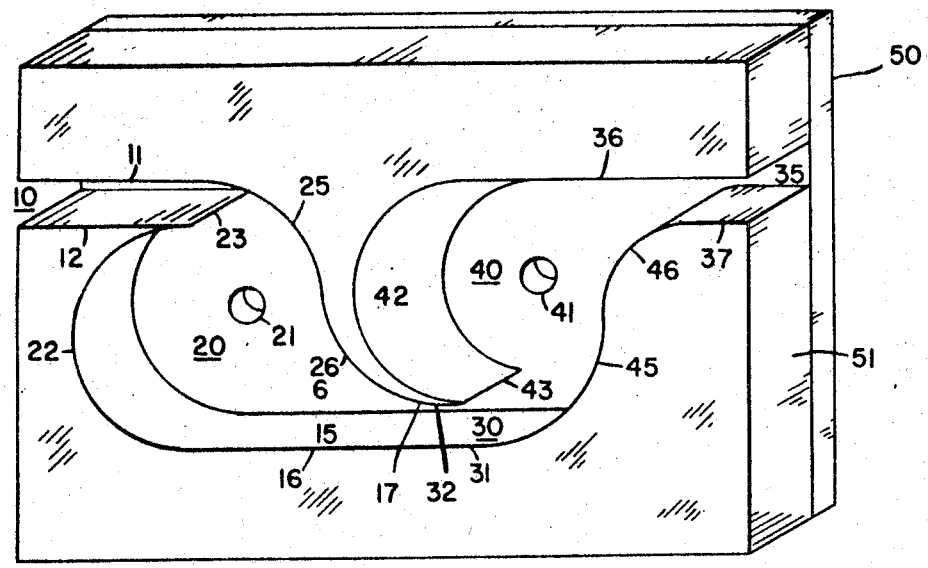
FIGURE 2 shows an isometric view of a diode in accordance with this invention, in which two units are placed in series.

FIGURE 2 shows an isometric view of a device incorporating two of the units shown in FIGURE 1. FIGURE 2 shows the two-dimensional nature of a preferred embodiment of the present invention. A backing plate 50 composed of any suitable material such as aluminum or plastic is apertured at 21 and 41 to provide vents centrally located with respect to chambers 20 and 40. In first conduit 10 the inner wall 12 meets the vortex chamber wall portion 22 at an acute angle at area 23 forming a vortex guide. Outer conduit wall 11 merges with the chamber wall 25 which in turn merges with conduit inner wall 17 through smoothly curving wall section 26. Conduit wall portion 17 is continuous with and is in fact indistinguishable from inlet conduit wall portion 32 for the second chamber 40 corresponding to wall portion 12 of the first chamber 20. Similarly, conduit 15 merges with and is indistinguishable from conduit 30 which forms the inlet conduit for the second interaction zone and chamber 40. Conduit wall 16 merges with and is continuous with conduit wall 31. Acute angled edge 43 corresponds to the area 23 of the first chamber and wall sections 42, 45, 46, 35, 36 and 37, correspond to wall sections 22, 25, 26, 15, 16 and 17 in the first interaction zone comprising vortex chamber 20.

Layer 51 is preferably made from plastic or aluminum or alternatively from any suitable inert material. The walls defining the chamber and other elements may be formed by stamping, cutting, injecting, molding, etching, or any other suitable method. A cover plate (not shown) will seal the entire unit so that all fluid flow will be restricted to apertures 10, 21, 41 and 35.

FIGURE 3 shows a schematic plan view of the series unit shown isometrically in FIGURE 2. Fluid flowing into the inlet conduit 10 passes easily past barrier 23 along wall areas 11, 25, 26, 17, 32, 43, 45, 46, 37, and leaves the device through outlet conduit 35 with little impedance to flow. In so doing, the fluid flow creates relatively low order vortices in chambers 20 and 40, with some resultant venting through vents 21 and 41.

FIGURE 4 shows the vortex vent diode under reverse flow conditions. Fluid entering through conduit 35 tends to follow the outer wall areas 36 and 42, and acute angle deflector 43 resulting in the creation of a relatively strong vortex in chamber 40 and in a high rate of venting through vent 41. A relatively small proportion of the fluid manages to flow out of the interaction area through conduit 30. The same situation occurs in the other interaction area with fluid flow into chamber 20 tending to flow along walls 16 and 22, and past acute angle deflector 23, resulting in a relatively strong vortex in chamber 20 with a large degree of venting through vent 21. Relatively little of the fluid manages to leave the device by conduit 10.

It will be noted that the vortices created by normal flow and by reverse flow are both in the same direction in the embodiments shown in these drawings. Thus, during a reversal of the flow, there is no time lag involved in reversing the direction of the vortices in the chambers.

Figure 5:
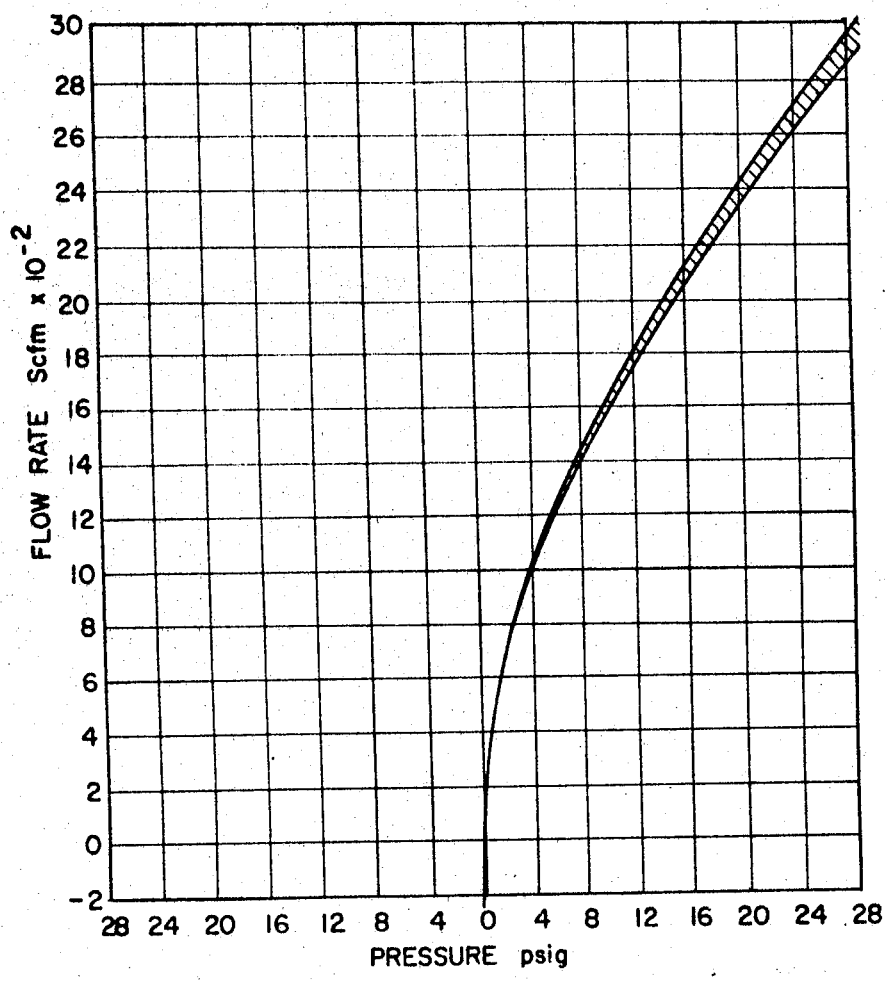
FIGURE 5 is a graph showing diode characteristics for a diode consisting of six units in series.

FIGURE 5 is a graph showing the vortex vent diode characteristics of a unit formed of six elements of the type shown in FIGURE 1. This would also correspond to three elements of the type shown in FIGURE 2. In the embodiment from which this graph was taken, the vent holes are approximately 1 mm. in diameter. Each chamber measured approximately 4 mm. in diameter and the six chambers were formed in series in a compact form as shown in FIGURE 2. The complete unit with inlet and outlet conduits measured about 38 mm. in length. The conduits measured about 1 mm. in cross section.

The graph shown in FIGURE 5 is a measure of flow rate through the outlet conduit charted against the pressure placed on the inlet conduit. It will be seen that under reverse pressure conditions there is substantially no flow leaving the output (conduit 10) of the device with the main flow occurring through vents 21 and 41. In the normal flow direction, the flow rate is more or less proportional to inlet pressure, especially after the pressure reaches about 4 pounds per square inch gauge.

Thus, the unit forms a very effective diode which offers little resistance to fluid flow in one direction but permits little or no fluid flow in the other direction.

Of course, this does not imply that impedance of the device is very high in the reverse direction since the fluid flowing into the device in the reverse direction is almost entirely discharged through the vents. However, there is a measurable restriction of input flow into duct 35 as compared with that into duct 10. These vents would presumably be open to the ambient atmosphere pressure in the case where the fluid employed is air. In any case, they would normally be opened to a sink for whatever fluid is being employed.

At normal flow direction, the vortex chambers which are incorporated in the design of the fluid diode, provide a vortex in which a portion of the mass flow of a fluid stream is diverted through an orifice whose axis is perpendicular to the mean velocity vector of the fluid stream. The configuration of the channel confining the said fluid stream is adapted in the vicinity of the orifice to induce and maintain a fluid vortex or swirl, with the rotational axis of the said swirl flow coinciding approximately with the axis of the said orifice.

By the use of the present invention, a means is provided of attaining substantially constant and uniform rate of unidirectional fluid flow from any fluid outlet passage. When the diode is operated as shown in FIGURE 2, the portion of the fluid stream which is diverted or bled out of the vent or orifice of the chamber is determined by many factors, such as the size of the vent orifice and the geometric configuration of the swirl chamber.

When the said fluid diode is connected in the reversed direction as shown in FIGURE 4, each swirl chamber of the diode will induce the fluid flow to form a vortex in the vicinity of the orifice with the rotational axis of the said swirl flow approximately coincident with the axis of the said orifice. The fluid vortices or swirls rotate in such a direction so as to oppose the flow of the fluid. The energy of the fluid stream is dissipated in the interaction of the fluid streams flowing opposite to each other. The portion of the fluid stream which is diverted or bled out of the swirl chamber is determined by the flow stream velocity, discharge orifice and the geometry of the swirl chamber, etc. The present invention provides a device which will bleed out most, or even all, of the input fluid flow through the discharge orifice in the swirl chamber when an input fluid flow is applied in the reversed direction of the pure fluid diode.

The fluid described in this invention can be a liquid or a gas. It can also be a suspension such as liquid or solid suspended in gas, solid particles suspended in a liquid, or some other variation of these phases.

In pure fluid logic systems, many devices have been developed in recent years in which a relatively large fluid stream (or power jet) is influenced by means of a much smaller fluid control jet or stream. The basic principal utilized in such operations is based on the action of one or more control jets, substantially normal to the direction of the power jet, which provide a means of influencing the direction and/or flow rate of the power jet as it emerges from the device. The proportion of the power jet entering into a plurality of outlet passages can thus be determined. One of the problems encountered in the use of devices of this type is an inherent instability phenomenon under high impedance and heavy back loading conditions. This effect upsets the operation of the power jet under the influence of the control jet because of the back pressure built up in one or more of the outlet passages. The present invention, when connected downstream of the outlet passage of the fluid logic elements, provides almost complete isolation of the back loading effects. Reflected pressure pulses and their influences are minimized or eliminated.

I claim:

1. A fluid control device comprising a first fluid inlet conduit and a second fluid inlet/outlet conduit, a fluid interaction region between the conduits, the interaction region providing a fluid passage through the device, a centrally continuously vented vortex chamber in the interaction region, the first inlet conduit opening into the chamber tangentially thereof with respect to the outer wall of the chamber, the inner wall of the first inlet conduit terminating at an acute angle to the outer wall of the chamber, the second inlet/outlet conduit opening into the chamber tangentially with respect to the outer wall of the chamber, the inner wall of the second inlet/outlet conduit merging with the outer wall of the chamber in a smoothly rounded curve, whereby fluid entering the interaction zone by the first inlet conduit meets minimum resistance in passing around the outer wall of the chamber and leaving the chamber through the second inlet/outlet conduit after flowing around the curved inner wall of the second inlet/outlet conduit and whereby fluid flowing into the interaction zone by the second inlet/outlet conduit tends to flow in a circle around the outer wall of the chamber and is impeded in leaving the chamber by way of the first inlet conduit by the acute angled projection forming the contact between the inner wall of the first inlet conduit and the outer wall of the chamber, and forms a vortex which tends to be vented through the vent in the chamber.

2. The combination of a fluid diode device according to claim 1 with a second substantially similar fluid diode device, the second inlet/outlet conduit of the first fluid diode device being connected to the first inlet conduit of the second fluid diode device.

References Cited

UNITED STATES PATENTS

| 1,329,559 | 2/1920 | Tesla | 137—81.5 XR |
| 2,841,182 | 7/1958 | Scala | 138—37 |
| 3,191,623 | 6/1965 | Bowles | 137—81.5 |
| 3,207,168 | 9/1965 | Warren | 137—81.5 |
| 3,216,439 | 11/1965 | Manion | 137—81.5 |
| 3,323,550 | 6/1967 | Lee | 137—81.5 |
| 3,331,382 | 7/1967 | Horton | 137—81.5 |

FOREIGN PATENTS

| 1,010,381 | 3/1952 | France. |
| 1,391,362 | 1/1965 | France. |

SAMUEL SCOTT, Primary Examiner